Dec. 8, 1970      G. O. REYNOLDS ET AL      3,545,842
ANALYSIS AND PROCESSING OF INCOHERENT RADIATION FIELDS
WITH CROSS-CORRELATED COMPOUND IMAGE DETERMINING MEANS
Filed Nov. 25, 1968

GEORGE O. REYNOLDS
DAVID J. CRONIN
INVENTORS

BY: ALFRED H. ROSEN
and
JOHN H. COULT
ATTORNEYS

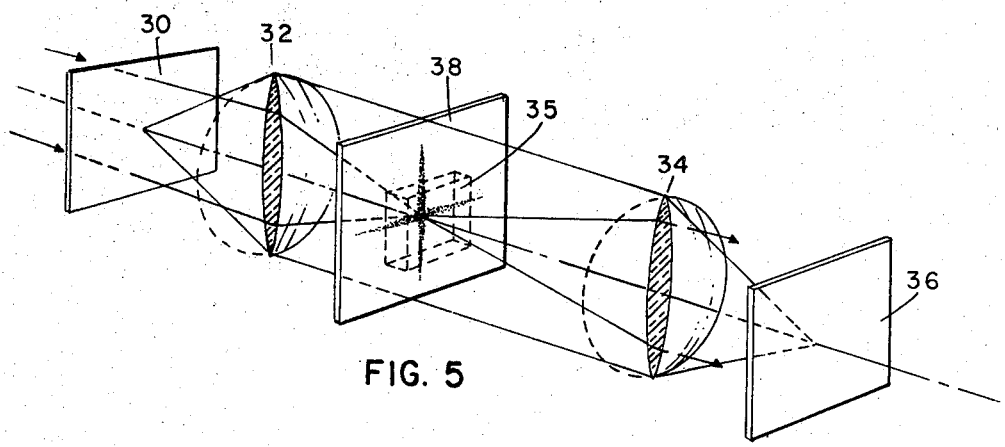
FIG. 5
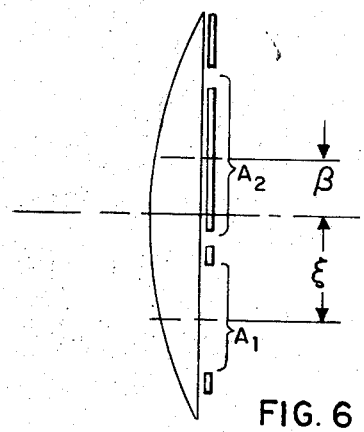
FIG. 6
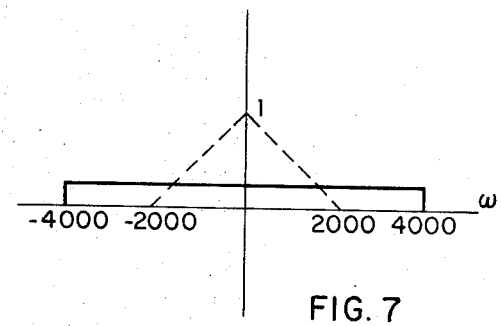
FIG. 7
FIG. 8
$$[I_1 + I_2]^2 = \mathcal{A}(x) \quad P/2$$
$$I_1^2 + I_2^2 = \mathcal{A}_0(x) \quad P/2$$
$$[I_1 + I_2]^2 = \mathcal{A}(x) \quad P/2$$
$$I_1^2 + I_2^2 = \mathcal{A}_0(x) \quad P/2$$

United States Patent Office 3,545,842
Patented Dec. 8, 1970

3,545,842
ANALYSIS AND PROCESSING OF INCOHERENT RADIATION FIELDS WITH CROSS-CORRELATED COMPOUND IMAGE DETERMINING MEANS
George O. Reynolds, Waban, and David J. Cronin, Sudbury, Mass., assignors to Technical Operations, Incorporated, Burlington, Mass., a corporation of Delaware
Filed Nov. 25, 1968, Ser. No. 778,662
Int. Cl. G02b 5/18
U.S. Cl. 350—162                                                6 Claims

ABSTRACT OF THE DISCLOSURE

This disclosure depicts the use of cross-correlated compound image-determining structures for analyzing and processing information carried by wavefront propagating from an object. Great freedoms in determining image spatial frequency constitution are obtained. Methods are shown for obtaining spatial distributions characterizing coherence functions of analyzed radiation fields.

BACKGROUND OF THE INVENTION

One of the most useful tools for analyzing an object by its radiated field, at least in the optical (including UV and IR) portion of the electromagnetic spectrum are imaging devices which collapse radiating wavefronts to a focus at a detection plane to form an image-wise amplitude distribution characteristic of the object. The limitations on information gathering imposed by imaging devices which are always imperfect and of finite extent, have been thoroughly investigated. The dependence of the resolution of an imaging system on its f-number and thus on its effective aperture (for a given focal length) predicates the need for very large and expensive light collectors in optical astronomy where the objects of interest are remote and the required focal lengths correspondingly great.

In the radio frequency portion of the electromagnetic spectrum imaging is not even attempted because of the very long wavelength of the radiation in this frequency range and thus the large size of the antennae that would be required to achieve satisfactory resolution. The approach to obtaining brightness maps of the radiating objects is to use spaced electronically coupled phased antenna arrays.

The basic radio interferometer consists of two antennas, each of which is capable of receiving radio emission from an object of interest. The antennas are placed on the ground a distance $s$ apart, and if their individual beam patterns are directional, are pointed at the object. Assume the object to be located at infinity and to give off incoherent radio emission in the frequency band to which the antenna receivers are tuned. The outputs from each antenna are cabled to a common location and correlated. The operation of the radio interferometer is, simply stated, a sampling of the electric field of the radiation from an object at two points in space at the same time, followed by a correlating (multiplying and time averaging) of these derived voltages. The final output is given mathematically by $$\gamma(\vec{s}) = \frac{<V(\vec{x}, t) \cdot V^*(\vec{x'}, t)>}{<V(\vec{x}, t) \cdot V^*(\vec{x}, t)>} \qquad (1)$$

where $\vec{s} = \vec{x'} - \vec{x}$ is the vector spacing or baseline of the interferometer, V is the field at position $\vec{x}$ on the ground, and $\gamma$ is called the visibility function for the object of interest. In optics $\gamma$ is referred to as the coherence function.

The visibility function $\gamma$ is, in turn, just the two-dimensional Fourier transform of the normalized spatial brightness distribution of the object being observed. In other words, a measurement obtained at a given spacing and orientation of the line joining the two antennas, defined by the vector $\vec{s} = \vec{x'} - \vec{x}$, yields one value in the visibility function, or one Fourier component of the brightness distribution. A complete set of these measurements can be Fourier inverted to recover the complete brightness distribution. This relationship is given by $$\gamma(\vec{s}) = \int B(\vec{z}) e^{j\vec{z} \cdot \vec{s}} d\vec{z} \qquad (2)$$

and $$B(\vec{z}) = \int \gamma(\vec{s}) e^{-j\vec{z} \cdot \vec{s}} d\vec{s} \qquad (3)$$

where $B(\vec{z})$ is the brightness distribution of the object, normalized to have a total flux density of unity, and $z$ is a point in the coordinate system defined on the object. It is clear that the only spacings $\vec{s}$ which give nonredundant values for $\gamma$ are those for which the projection of $\vec{s}$ onto the $z$ system is actually different. Also, because $B(\vec{z})$ is real, $\gamma(\vec{s})$ is equal to $\gamma(-\vec{s})$. In other words, one need only define $\gamma$ over one-half of a plane that is normal to the line of sight.

If one imagines a large antenna having a receiving area which covers a large part of the receiving plane, then two small antennas spaced a predetermined distance apart give the same information that is obtained from corresponding pieces of the large antenna; therefore, by moving the small antennas around the plane to cover all the pieces of the large antenna, one can synthesize the large aperture with two small apertures.

While there are many interesting mathematical relationships that can be derived from Eqs. 2 and 3, one very useful consequence is the sampling theorem. The theorem states that if the brightness distribution is confined in space (i.e., is zero outside some circle surrounding the object), then the visibility function need only be sampled at discrete intervals of the spacing, $\vec{s}$. The transform Eq. 3 then becomes a Fourier series. This theorem is obviously of enormous practical value when a considerable amount of time is consumed in obtaining any given point in the visibility function.

The brightness distribution that is obtained from the discretely sampled visibility function is a repetitive function in the sense that the object distribution appears as a complete picture at many places on the $\vec{z}$ plane. An equivalent statement is that the system that samples the visibility function instead of obtaining the whole function has high sidelobes. This, of course, is acceptable if the object is small enough so as not to appear in any two sidelobes at once. The distance between sidelobes is determined by the interval between successive samples of the visibility function.

We have shown above that if one samples the visibility function over all spacings of the interferometer in general, or at discrete intervals when the object is confined, then a complete picture of the brightness distribution can be recovered. In any practical observational scheme, to obtain all the spacings is, of course, impossible. The first restriction on any real instrument is a limit on the maximum spacing of the two antennas that can be obtained. This implies that there is a limit to the size of the aperture that can, in practice, be synthesized, which, in turn, is a limiting factor on the resolution of the instrument.

A second restriction is the minimum interval of spacing available. The effect of this, as mentioned above, is to give high sidelobes. If there are any spacings missing from an otherwise uniform coverage of the visibility function, the effect is also to add possibly unwanted sidelobes into the overall spatial sensitivity pattern.

In the field of underwater acoustics, where the radiation field of interest generally represents a pattern of acoustical wavefronts reflected from an object of terrain, the long wavelengths involved compel the use of large imaging elements which in the present state of the art may comprise, for example, hollow lens-shaped containers filled with a very high index fluid. Imaging elements thus constructed are massive and expensive and produce resolutions which are quite unsatisfactory.

Thus, it is evident that in applications wherein the object distances or radiation wavelengths involved are very large, the size, weight, and expense of the required imaging elements became very burdensome.

A further limitation on the retrieval of information from radiation fields by the use of imaging systems involves the low-pass filtering effect of imaging systems when used in incoherent radiation. The modulation transfer characteristic of a system of imaging elements in incoherent radiation inherently represents an autoconvolution of the system aperture. As is well known, an autoconvolution function of a rectangular (unapodized) aperture function is cone shaped, illustrating a relative loss of high spatial frequency information. Ideally, unless some special effects are desired, an imaging system should transmit all spatial frequencies equally; i.e., it should have a flat frequency response.

Attempts to enhance the characteristics of incoherent images by filtering the spatial frequency domain with a particularly configured filter function have met with some success but the applicability of the developed techniques is extremely limited. For example, see K. Sayanagi, J. Appl. Phys. (Japan), 27, 623-32. The radio interferometry practitioners have found ways to cross-correlate distributions in the frequency plane to some advantage; however, their techniques have not been extensible to the optical spectrum because of the incapability of optical detectors to sense phase information. For example, see IRE Trans. A.P. 5, (1957), 247; IRE Trans. A.P. 10 (1962), 126; "Theory of Partial Coherence." Parrent and Beran, Prentice-Hall, N.J., (1964); and "Radio Astronomy," Kraus (McGraw-Hill, 1966), especially pp. 169–82.

It would be desirable in many circumstances to have a spatial distribution characterizing the coherence of a radiation field. To date, the only method of obtaining such a distribution is by point sampling techniques; i.e., by sampling the radiation field either: (1) with a very large number of point detectors arrayed in a predetermined geometry throughout the field, or (2) the acquisition with a single pair of detectors of a large number of samples of the radiation field at different spatial intervals and orientations. Obviously, the former method is extremely expensive and the latter time consuming, as well as expensive.

OBJECTS OF THE INVENTION

It is an object of this invention to provide methods and structures for analyzing and processing incoherent radiation fields to obtain more information about the source of the field than is obtainable by present methods and structures. It is an object of this invention to teach novel imaging systems and methods providing previously unobtainable freedoms in determining modulation transfer characteristics.

It is another object to provide imaging means and image processing methods for enhancing the resolution of imaged objects.

It is still another object to provide imaging systems which require substantially less radiation collecting surface area than conventional imaging systems, and which are much lighter and less expensive than conventional systems of comparable performance.

It is still another object of this invention to provide methods and structures for obtaining a spatial distribution characterizing coherence functions of a radiation field.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 5 illustrates a coherent optical processing system employing the FIG. 4 filter for processing a record formed as shown in FIG. 2;

FIG. 6 depicts schematically another form of image determining means following the teachings of this invention;

FIG. 7 illustrates the modulation transfer characteristic of the FIG. 6 embodiment; and FIG. 8 is a schematic illustration of a process which may be used in the practice of the present invention for subtracting one two-dimensional optical distribution from another.

DESCRIPTION OF THE PREFERRED EMBODIMENTS

Figure 1:
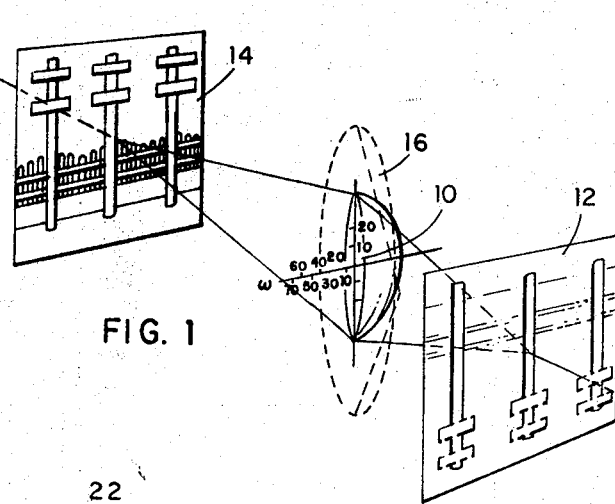
FIG. 1 illustrates a conventional optical lens imaging an incoherently illuminated scene containing objects representing different spatial frequencies; the conically shaped modulation transfer characteristic of the lens, representing a distribution in spatial frequency coordinates, is shown superimposed on the lens itself to illustrate the effect of the lens of attenuating high spatial frequency information relative to low frequency information in the scene.

FIG. 1 shows schematically an ideal positive lens 10 forming an image 12 of an object 14 and illustrates, greatly simplified the nature of the intensity transfer function 16 of the lens 10. The object 14 has been selected to illustrate a scene containing periodic patterns of different spatial frequencies. For example, suppose that the spatial frequency of the illustrated telephone poles represents 1 l./mm., that cross arms on the telephone poles 15 l./mm., the picket fence rails 25 l./mm. and the fence pickets 40 l./mm. At the aperture plane of the lens 10 light from the object is no longer in an image-wise distribution but is distributed according to the spatial frequency constitution of the object, the higher frequency information being located farther from the axis. The lens does not pass all spatial frequencies equally, but favors the lower frequency information. This effect is illustrated by the conically shaped distribution shown in broken lines which represents the intensity transfer function 16 of the lens 10.

Assuming the hypothetical scale of spatial frequencies labeled on the axes of the aperture plane, it is seen that the lens 10 will pass D.C. (zero frequency) components in the scene with unity attenuation, that is to say, background illumination is transmitted without any attenuation relative to the effect on higher spatial frequency information. It may be useful to relate the manner in which lens 10 transfers spatial frequencies in an incoherent imaging system to the object 14 and its image 12. The transfer function 16 is shown as cutting off at 40 l./mm. Thus, the fence pickets at 40 l./mm. are incapable of being transferred by the lens. Accordingly, the image 16 does not show the fence pickets which have been filtered out by the lens. The horizontal fence rails have a spatial frequency of 25 l./mm. and are passed by the lens, but with relatively low modulation. Thus, in the image, the fence rails appear in very low contrast and are barely seen. The telephone poles at 1 l./mm. are transferred without appreciable attenuation and thus appear in the image 14 substantially as represented in the object 12. The pole cross arms at 15 l./mm. are transmitted with some attenuation and thus appear in the image with less fidelity than the poles themselves.

Using conventional imaging techniques, attempts to increase image resolution are inexorably associated with the use of larger and larger lenses, which for the reasons set forth above, have the effect of extending the bounds of the transfer characteristic to pass higher spatial frequency information. However, a point of diminishing returns is reached as lens apertures are increased when the cost and in the case, for example, of astronomical telescopes, the weight and bulk of the imaging system and its associated apparatus becomes very large. By this invention imaging means and image processing methods are shown by which quality images can be formed with imaging structures having a fraction of the light collecting area and thus are much lighter and less bulky than conventional apparatus.

An ideal intensity transfer characteristic is a characteristic which transfers all frequencies equally out to the highest frequency which is desired to be retrieved. Such a transfer characteristic has not been obtainable with conventional techniques and structures because of the above-described autoconvolution phenomenon which has a smoothing effect inevitably resulting in high spatial frequencies being transferred with greater attenuation than low frequencies. This invention teaches a way to provide an intensity transfer characteristic which has practically any desired configuration, including a configuration which is flat throughout a predetermined range of frequencies.

Further, as intimated above, the principles of the invention lay a basis for the design of structures for rendering two-dimensional coherence maps of a radiation field. Although the number of embodiments of the invention which might be here considered is very great, the following are deemed sufficient to teach the principles underlying the invention. One illustrative embodiment, shown in FIG. 2, utilizes imaging means in combination with an aperture in the form of a cross, resembling an aperture known in radio interferometry as a Mills cross aperture. In order to most clearly illustrate the nature of the invention, the combination of imaging means and a Mills cross aperture is shown (FIG. 2) as taking the form of a lens 20 which has been cut away to leave only thin cross-shaped slices intersecting orthogonally. The intensity transfer function 21 of such an image determining means is shown in skeleton lines in FIG. 2 at the aperture plane of the lens 20 and corresponds to the transfer function 16 of simple lens 10 in FIG. 1. The function 21 has cross-shaped components 22 extending in frequency space a distance equal to twice the radius of the lens 20 and representing the autocorrelation of each of the arms of the lens aperture with itself. The function 21 also includes a box-shaped component 24 equal in width to the diameter of the lens 20 which represents a cross correlation of the components 22. This component will hereinafter be termed the cross component to distinguish it from the triangular autocorrelation components 22. It will be recognized that the cross component 24 represents an equal transfer of all frequencies out to one-half the cut-off frequency of the autocorrelation components 22.

In this system all elements of the lens 20 must have appropriate curvature so that the associated point-spread functions overlap and the coherence length of the radiation is preserved. The two diffraction patterns formed by the orthogonal arms will interfere. If we assume that the arms have length $2a$ and $\delta$ function width for ease of calculation, then the intensity impulse response of the lens 20 is $$\mathcal{G}(x, y) = \left| \text{sinc}\frac{2\pi ax}{\lambda f} + \text{sinc}\frac{2\pi ay}{\lambda f} \right|^2 \quad (4)$$

where $\bar{\lambda}$ represents the mean wavelength of the radiation and $f$ is the effective focal length of the lens 20.

The corresponding transfer function of the lens, in frequency cordinates $(\mu_x, \mu_y)$ is $$\tau(\mu_x \mu_y) = T(\mu_x|2a) + T(\mu_y|2a) + 2\text{Rect}(\mu_x|a)\text{Rect}(\mu_y|a) \quad (5)$$

where $$T(\mu|2a) = \begin{matrix} 1-\frac{|\mu|}{2a} & |\mu| \leq 2a \\ 0 & \mu > 2a \end{matrix} \quad (6)$$

represents the triangular autocorrelation components 22 and $$\text{Rect }(\mu/a) = \begin{matrix} 1 & |\mu| < a \\ 0 & |\mu| > a \end{matrix} \quad (7)$$

represents the rectangular cross component 24. Thus, the two-dimensional transfer function consists of one-dimensional triangular functions along the $\mu_x$ and $\mu_y$ axes, respectively, and a two-dimensional box of width $2a$ centered at the axis. The image obtained through such a system is given by $$I_{\text{im}}(x, y) = \int I_{\text{ob}}(\xi, \eta) \mathcal{G}(x-\xi, y-\eta) d\xi d\eta \quad (8)$$

Images formed by lens 20 on a recording medium 26 would be dominated by the radiation associated with the autocorrelation components 22. In order to create the effect of a transfer function resembling the cross component 24, the image record must be further processed to remove the autocorrelation components 22. This may be done in a number of different ways; we have found an optical processing method using an inverse filter to work satisfactorily. The image formed by the lens 20 is recorded photographically and properly processed. An inverse filter representing the reciprocal of the transfer function characterized by the autocorrelation components 22 is prepared and placed in the transform plane of a coherent optical Fourier transformation system. If the image record is then located in the system in the object position, the inverse filter will alter the transfer function of the system such that upon retransformation he image obtained will represent an image formed with frequency components as characterized only by the cross component 24 of the transfer function.

Figure 2:
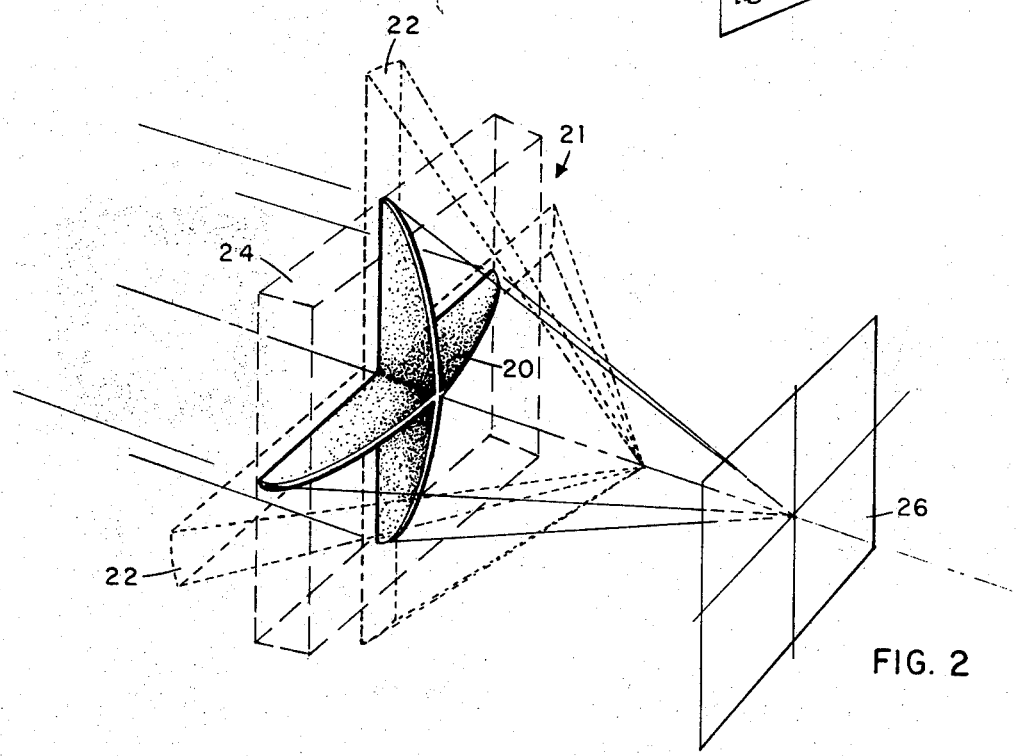
FIG. 2 illustrates a compound optical imaging device designed according to the teachings of this invention.
Figure 3:
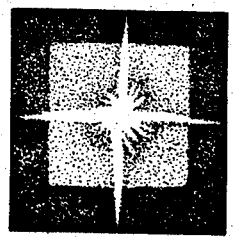
FIG. 3 represents a record of the modulation transfer function of the FIG. 2 device.
Figure 4:
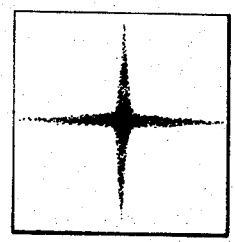
FIG. 4 illustrates an inverse optical filter useful in the practice of this invention.

The above-described embodiment may be implemented to verify the principles of the invention by merely masking off a conventional bi-convex lens to define a cross-shaped aperture having, for example, dimensions such as arms 55 mm. in length and one mm. in width on a 19½" focal length lens. With a 6μ pinhole illuminated by a mercury arc lamp serving as an object, the transfer function of the lens would appear as shown in FIG. 3. An inverse filter for removing the autocorrelation components from the transfer function may be formed by recording this transfer function but controlling the exposure such that the cross component is clipped. The inverse filter after processing would appear as shown in FIG. 4. An image of the desired scene is then recorded as shown in FIG. 2 through the masked lens, and after appropriate processing, is placed in a coherent optical Fourier transformation system ae shown schematically in FIG. 5. In the FIG. 5 system the scene record 30 is illuminated by a beam of collimated light and is imaged by a pair of lenses 32 and 34 as output plane 36. Lens 32 estabilshes a Fourier transform of the record 30 at a Fourier transform plane intermediate the lenses 32 and 34. An inverse filter 38 as described above is placed in the Fourier transform plane of the system to remove the autocorrelation components 22 from the spatial frequency distribution. The effective transfer function of the FIG. 5 system, after filtering, is then defined by the box-shaped cross component 35 shown superimposed at the Fourier transform plane in FIG 5.

We have thus described a method which enables images to be recorded in incoherent light with a flat transfer characteristic, a goal not attainable with prior art methods and structures. A very large number of other systems may be designed using the above-described principles to achieve various effects. A second embodiment will now be described which is capable of yielding resolutions substantially greater than the Mills cross system described above and yet which is also capable of providing a flat frequency response throughout the entire range of transferred frequencies.

The aperture configuration in the embodiment to be described is related to an aperture configuration used in radio interferometry and known as the Covington-Drane aperture. A mathematical description of the aperture and its effect can be found in the literature, for example, in the above-referenced text of Parrent and Beran, pp. 127–132.

Let us consider the FIG. 6 system comprising an imaging means, shown schematically as a simple plano-convex lens 50, combined with two apertures $A_1$ and $A_2$. It is critical that the apertures $A_1$ and $A_2$ be associated with a common imaging surface or surfaces for two reasons: (1) to cause the radiation patterns from the various apertures to overlap, and (2) to preserve path lengths so that the radiation patterns will interfere when they overlap. *Note that it is important to preserve temporal coherence so that the impulse response will contain a cross term.*

If $A_1$ is a clear aperture of width $2d$ and $A_2$ consists of two small apertures (assumed to be delta functions for ease of calculation) separated by a distance $2d$, then, if the two apertures are aligned end to end, as in FIG. 6, the impulse response in the image plane (in the $y$ dimension) is given by:

$$\delta(y) = \left| B_1 2d e^{\frac{2\pi i \xi y}{\lambda f}} \operatorname{sinc} \frac{2\pi dy}{\lambda f} + 2B_2 \cos \frac{2\pi dy}{\lambda f} e^{\frac{-2\pi i \beta y}{\lambda f}} \right|^2$$

$$= B_1^2 4d^2 \operatorname{sinc}^2 \frac{2\pi dy}{\lambda f} + 4B_2^2 \cos^2 \frac{2\pi dy}{\lambda f} \quad (9)$$

$$+ 8dB_1 B_2 \operatorname{sinc} \frac{2\pi dy}{\lambda f} \cos \frac{2\pi dy}{\lambda f} \cos \frac{2\pi y}{\lambda f}(\xi + \beta)$$

where $$B_1{}^2 = \left| \int_{A_1} dx \right|^2 = \text{energy passing through } A_1 \quad (10)$$

$$B_2{}^2 = \left| \int_{A_2} dx \right|^2 = \text{energy passing through } A_2 \quad (11)$$

If $\xi + \beta = 2d$, and $B_1{}^2 \gg B_2{}^2$, then $$\mathcal{J}^{\delta}(y) \cong B_1{}^2 4d^2 \operatorname{sinc}^2 \frac{2\pi dy}{\lambda f} + 8dB_1 B_2 \operatorname{sinc} \frac{8\pi dy}{\lambda f} \quad (12)$$

The resulting transfer function is the sum of the two terms which are separately shown in FIG. 7. Thus, in order to realize the transfer function due alone to the cross term of Eq. 9, we must subtract the contribution due to the apertures $A_1$ and $A_2$ taken individually. The optical processing method described above is applicable; however, a number of other approaches may be taken. It is anticipated that both real-time and nonreal-time techniques can be eventually employed. These schemes will now be discussed in these two categories.

NONREAL-TIME PROCESSING SYSTEMS (1) Holographic method.—The incoherent image (which is a convolution of the object with the impulse response described by Eq. 12) obtained from the image determining system of FIG. 6 may be stored as a Fourier transform hologram. Superimposed upon the same hologram, another Fourier transform hologram having a $\pi$-phase shift may be stored. This second hologram must be made from an image formed with the clear aperture $A_1$. Upon reconstruction, a subtraction is realized in the sideband images, and the sideband images which remain contain frequency information influenced only by the second term in Eq. 12. For a more detailed treatment of holographic subtraction techniques, see Holography by DeVelis and Reynolds (Addison-Wesley Pub. Co., 1968), especially pp. 153–4 and the references cited therein. In principle, it is possible to extend this idea to more than two apertures.

(2) Computer method.—In this method, the same technique described under the holographic method is performed by a digital computer. Since the bandwidth of the computer is not as great as that of the optical system described earlier, there will be a resolution or field-of-view restriction imposed by this technique. Nevertheless, for many applications it may be superior to the other methods described above.

(3) Fourier subtraction technique.—A technique constituting an invention of Peter F. Mueller, described and claimed in application Ser. No. 726,455, filed May 3, 1968, may be utilized for processing the recorded signal. It is possible to record an interlaced image using Ronchi rulings (with the geometry of FIG. 8). For example, for the FIG. 6 system, $|I_1 + I_2|^2$ is the contribution from the entire aperture while $|I_1|^2$ is the contribution from the large aperture alone ($A_1$) and $|I_2|^2$ is the contribution from the two small apertures ($A_2$) alone.

The general expression for an interlaced image such as this is $$P(x) = \mathcal{J}_0(x)$$

$$+ [\mathcal{J}(x) - \mathcal{J}_0(x)] \operatorname{Rect}\left(x \Big| \frac{p}{2}\right) * \sum_n \delta(x - np) \quad (13)$$

where $$\mathcal{J}_0(x) = |I_1|^2 + |I_2|^2 \quad (14)$$

and $$\mathcal{J}(x) = |I_1 + I_2|^2 \quad (15)$$

The Fourier transform of this distribution is $$P(\mu) = \tilde{I}_0(\mu) \delta(\mu)$$

$$+ \frac{1}{2} \sum_n |\tilde{I}(\mu) - \tilde{I}_0(\mu)| * \operatorname{sinc} \frac{n\pi}{2} \delta\left(\mu + \frac{n}{p}\right) \quad (16)$$

If the transform is filtered for the first order, for example, and the distribution is retransformed, the resulting image is $I(x) - I_0(x)$, which, for the FIG. 6 system, is just $2I_1 I_2$. This is the cross term of interest.

Another optical subtraction technique uses the same interlaced exposures as above. In this case, one exposure is that from the aperture, or $|I_1 + I_2|^2$, and the other exposure is $|I_1 - I_2|^2 \cdot |I_1 - I_2|^2$ can be formed in practice by merely placing a $\pi$-phase shift over 1 element of a 2-element compound aperture (for example, over one arm of the lens 20 in the FIGS. 1–5 embodiment). The difference between these two terms is then $4I_1I_2$, or twice the cross product of interest.

Either of these two techniques may be accomplished in the laboratory by double exposing either in time or space. It is possible to expose through a Ronchi ruling using the aperture without the $\pi$-phase shift, and then simultaneously shift the Ronchi ruling by half a period and introduce the $\pi$-phase shift at the aperture. It is also possible to make two exposures simultaneously with two apertures, and then interlace the two images and process at a later time in the laboratory.

REAL-TIME PROCESSING SYSTEMS (1) Modulation method.—In this method one of the apertures in FIG. 6 is modulated in time (i.e., a phase switch). Then Eq. 12 becomes $$\mathcal{J}^\delta(y) = \left| 2dB_1 e^{\frac{2\pi i \xi y}{\lambda f}} \operatorname{sinc} \frac{2\pi dy}{\lambda f} e^{i\omega t} + 2B_2 \cos \frac{2\pi dy}{\lambda f} e^{\frac{2\pi i \beta y}{\lambda f}} \right|^2 \quad (17)$$

The cross term, which is an amplitude modulated sinusoid, is $$16dB_1B_2 \operatorname{sinc} \frac{8\pi dy}{\lambda f} \cos \omega t \quad (18)$$

The signal is demodulated by a scanning system such as an image dissector coupled with a synchronous phase and envelope detector to yield the cross term of interest. The disadvantage of this method is the resolution limitation imposed by the image dissector.

(2) Scanning method.—An aptical scanning method may be used in which two frequency plane records are made, one containing the distribution formed through the image-determining means and one containing a distribution without the cross component. If both records are placed in registration on a scanning photometric instrument and subtracted point by point, the resulting image represents the image contained in the cross term. If a continuous gray scale printout system is used, the corrected photography should result.

We have provided methods and structures with which it is definitely possible to construct optical arrays capable of approaching theoretically predicted resolution from the cross correlation term. It is evident that a large compound image-determining means may be used to obtain resolutions that are comparable with equivalent full apertures which contain many more resolution elements. For example, if we examine the FIG. 2 embodiment and consider the cross as an array of 1 mm. squares, then we have an equivalent array of forty-nine 1 mm. apertures. The equivalent full aperture is made up of $(25)^2/4 = 156$ apertures. Thus, it is seen that we use an aperture with approximately 3.2 times less area in the synthetic array than in the corresponding full array and obtain the same information, but at higher contrast. A gain in resolution of approximately 6 is expected by using the array rather than the 1 mm. aperture. This is in good agreement with experimental results.

A second advantage stems from the fact that the optical synthetic apertures work for incoherent illumination and have transfer functions which are cross correlations rather than autocorrelations. *This means that a system having a flat transfer characteristic may now be realized at optical frequencies with incoherent illumination.* It is evident from the above discussion that the principles of the invention may be used to form images with any predetermined spatial frequency constitution. Referring to the FIG. 6 embodiment, it is manifest that aperture $A_1$, rather than being clear as shown (yielding a rect function) could be given any selected filter function to produce a cross-correlation component having a distribution related to the shape of the filter function.

The described image-determining means is non-linear in intensity when highly coherent illumination is used; however, if a laser would be a desirable light source for a particular application, the coherence of its beam could be reduced by passing the beam through a moving diffuser (see J. Opt. Soc. Am. 56, 1001 (1966)).

The principles underlying the invention are readily adapted to provide second and higher order coherence measurements. Consider the problem of obtaining a two-dimensional map of the second order coherence characteristic of a radiation field. In this connection, the FIG. 2 image-determining means with its flat transfer function is a very suitable device for masuring the coherence function in the plane of the aperture when the light emanates from an incoherent source and propagates in a homogeneous medium. The Van Cittert-Zernike theorm states that the coherence function $\Gamma_{12}(0)$ in the aperture plane due to an incoherent source may be found by Fourier transforming the intensity distribution in the source, if the source dimensions and the separation between sampling points are small compared with the distance between the source and the sampling plane.

A new method of photographing this coherence function will now be described. A photograph of the incoherent source is taken using a Mills cross lens 20 as shown in FIG. 2. The photographic film is processed to a $\gamma = -2$, so that the amplitude transmittance of the photographic film is proportional to the intensity distribution of the source. If the film containing an image of the source is now placed in a Fourier transform system as shown in FIG. 5 and Fourier transformed with a lens of the appropriate focal length (to avoid scaling, a lens of the same focal length as the distance from the source to the plane of interest should be used), the amplitude distribution in the transform plane is the coherence function $\Gamma_{12}(0)$ convolved with the transfer function of the Mills cross lens 20. If the transform is then multiplied by an inverse filter as described above (resulting in unit transfer function), the resultant amplitude distribution in the transform plane is just the coherence function $\Gamma_{12}(0)$ which existed in the original plane of the Mills cross lens 20. Recording on film, or measuring with a scanning photometer, will then yield the intensity distribution of the modulus-squared coherence function, $|\Gamma_{12}(0)|^2$. This technique has an advantage over prior art techniques, e.g., as described by Bouche and Kellen in J. Opt. Soc. Am. 53, 1350-A (1963), in that the D.C. energy collected by the lens is much less and the dynamic range of the film is not saturated by this D.C. energy, and as such is more useful.

Certain changes may be made in the above-described apparatus without departing from the true spirit and scope of the invention herein involved, and it is intended that the subject matter of the above depiction shall be interpreted as illustrative and not in a limiting sense. For example, rather than employing a refractive image-forming means as described above, catadioptric systems might be employed.

What is claimed is:
1. A method of processing a radiation field, comprising:
intercepting wavefronts propagating from an object with a compound image-determining means having at least two discrete elements and a cross-correlation axis, each element having an element aperture and a wave-focusing surface comprising a part of a common wave-focusing surface whereby said elements have the same focal length and focal plane, the combination of elements having a sampling area determined by the smallest common area of overlap of the element apertures along said cross-correlation axis, said elements forming an intensity image containing contributions from each of said elements individually and a cross-correlation term or terms char- acterizing point-by-point interference between said elements; and processing said image to attenuate undesired constituents thereof.

2. The method defined by claim 1 wherein said processing of said image comprises attenuating said individual element contributions, relative to said cross-correlation term.

3. The method defined by claim 2 wherein said processing of said image, comprises:
- making a record of said image;
- making a spatial frequency filter comprising a negative transparency representing a sum of autocorrelation distributions of the aperture distributions of each of said elements;
- illuminating said image record in a coherent optical projection system;
- forming a Fourier transform of said record in a Fourier transform space in said system;
- aligning said filter in said Fourier transform space to remove said autocorrelation distributons; and
- retransforming said Fourier transform to reconstruct said image with substantially only the spatial frequency distribution represented by said cross-correlation term.

4. A method of processing a radiation field to obtain a measurement of coherence therein, comprising:
- intercepting wavefronts propagating from an object with a compound image-determining means having at least two discrete elements and a cross-correlation axis, each element having an element aperture and a wave-focusing surface comprising a part of a common wave-focusing surface whereby said elements have the same focal length and focal plane, the combination of elements having a sampling area determined by the smallest common area of overlap of the element apertures along said cross-correlation axis, said elements forming an intensity image containing contributions from each of said elements individually and a cross-correlation term or terms characterizing point-by-point interference between said elements;
- processing said image to attenuate said individual element contributions relative to said cross-correlation term; and
- establishing a Fourier transform of said image with said individual element contributions attenuated, said Fourier transform representing a second order coherence map of said field.

5. A method as defined by claim 4 wherein said processing of said image comprises:
- forming a record of said image;
- making a spatial frequency filter comprising a negative transparency representing a sum of autocorrelation distributions of the aperture distributions of each of said elements;
- illuminating said image record in a coherent optical projection system;
- forming a Fourier transform of said record at a Fourier transform space in said system;
- aligning said filter in said Fourier transform space to remove said autocorrelation distributions; and
- making a record of said Fourier distribution after said filtering, said record characterizing a second order coherence function of said field.

6. A compound image-determining means having at least two discrete elements and a cross-correlation axis, each element having an element aperture and a wave-focusing surface comprising a part of a common wave-focusing surface whereby said elements have the same focal length and focal plane, the combination of elements having a sampling area determined by the smallest common area of overlap of the element apertures along said cross-correlation axis, said elements being capable of forming an intensity image containing contributions from each of said elements individually and a cross-correlation term or terms characterizing point-by-point interference between said elements.

References Cited
UNITED STATES PATENTS

| | | | |
|---|---|---|---|
| 3,453,048 | 7/1969 | Williams | 350—162 |
| 3,466,110 | 9/1969 | Pole et al. | 350—162 |

RICHARD A. FARLEY, Primary Examiner

W. T. RIFKIN, Assistant Examiner